(12) United States Patent
Feder et al.

(10) Patent No.: US 8,107,543 B2
(45) Date of Patent: Jan. 31, 2012

(54) HIGH DIVERSITY TIME-SPACE CODING AND DECODING FOR MIMO SYSTEMS

(75) Inventors: Meir Feder, Herzliya (IL); Eran Doron, Hertzlia (IL); Baruch Bublil, Netanya (IL)

(73) Assignee: Amimon Ltd., Herzlia (IL)

(*) Notice: Subject to any disclaimer, the term of this patent is extended or adjusted under 35 U.S.C. 154(b) by 780 days.

(21) Appl. No.: 11/426,898

(22) Filed: Jun. 27, 2006

(65) Prior Publication Data
US 2007/0297528 A1 Dec. 27, 2007

(51) Int. Cl.
H04L 27/28 (2006.01)

(52) U.S. Cl. ........ 375/260; 375/259; 375/267; 375/295; 375/300

(58) Field of Classification Search .................. 375/260, 375/295, 259, 267, 300
See application file for complete search history.

(56) References Cited

U.S. PATENT DOCUMENTS

| | | | |
|---|---|---|---|
| 6,185,258 B1 | 2/2001 | Alamouti et al. | |
| 6,711,124 B2 | 3/2004 | Khayrallah et al. | |
| 6,731,619 B1 | 5/2004 | Ramesh et al. | |
| 6,731,668 B2 | 5/2004 | Ketchum | |
| 6,775,329 B2 | 8/2004 | Alamouti et al. | |
| 6,804,307 B1 | 10/2004 | Popovic | |
| 6,816,557 B2 | 11/2004 | Kuchi et al. | |
| 6,862,434 B2 | 3/2005 | Wallace et al. | |
| 6,873,606 B2 | 3/2005 | Agrawal et al. | |
| 6,889,335 B2 | 5/2005 | Calderbank et al. | |
| 7,406,055 B2 * | 7/2008 | Taira et al. | 370/310 |
| 2004/0033782 A1 | 2/2004 | Horng et al. | |
| 2004/0121730 A1 | 6/2004 | Kadous et al. | |
| 2004/0202257 A1 | 10/2004 | Mehta et al. | |
| 2004/0213187 A1 | 10/2004 | Fujil | |
| 2005/0254596 A1 | 11/2005 | Naguib | |
| 2005/0265475 A1 | 12/2005 | Sun et al. | |
| 2006/0018415 A1 * | 1/2006 | Jung et al. | 375/347 |
| 2006/0093057 A1 | 5/2006 | Zhang et al. | |
| 2006/0133530 A1 * | 6/2006 | Kwak et al. | 375/267 |
| 2007/0211822 A1 * | 9/2007 | Olesen et al. | 375/299 |
| 2008/0317157 A1 * | 12/2008 | Ihm et al. | 375/267 |

OTHER PUBLICATIONS

Alamouti, S. "A Simple Transmit Diversity Technique for Wireless Communication." IEEE Journal on Select Areas in Communcations. vol. 16. No. 8. Oct. 1998.
International Search Report for PCT/IL07/00779, mailed on Mar. 19, 2008.

* cited by examiner

Primary Examiner — Kenneth Lam
(74) Attorney, Agent, or Firm — Eitan Mehulal Law Group (57) ABSTRACT

A diversity transmission scheme uses a number of antennas that is greater than the limitation of two transmitting antennas in the well-known Alamouti scheme. In an embodiment comprising four antennas, the antennas transmit in pairs such that each antenna transmits a block that is used in the Alamouti scheme. This increases the transmission rate. For example, the transmission of two signals at a given time slot increases transmission rate by a factor of two. The invention not only increases the number of antennas, but also increases the transmission rate. At the receiver end, the code is decoded without matrix inversion and without much noise enhancement. Moreover, noise enhancement stability is increased by a simple, partial interference cancellation scheme, that results in improved decoding performance.

19 Claims, 5 Drawing Sheets

|  | Time t | Time t+T |
|---|---|---|
| Antenna 0 | $S_0$ | $S_1$ |
| Antenna 1 | $-S_1^*$ | $S_0^*$ |

FIGURE 1 (PRIOR ART)

|  | Time t | Time t+T |
|---|---|---|
| Antenna 0 | $S_0$ | $-S_1^*$ |
| Antenna 1 | $S_1$ | $S_0^*$ |
| Antenna 2 | $S_2$ | $-S_3^*$ |
| Antenna 3 | $S_3$ | $S_2^*$ |

| | QPSK (ML detector) | High Diversity 16QAM (zero-forcing) | High Diversity 16QAM w/Control Unit |
|---|---|---|---|
| Transmitter | Simple transmitter | 1 OFDM symbol delay | 1 OFDM symbol delay |
| Receiver | No delay | 1 OFDM symbol delay | 1 OFDM symbol delay |
| # Tx/Rx Antennas | 4/M | 4/M | 4/M |
| Cost functions calculation for the decision rule [per bin] | 4xMx256 complex multiplications (abs(y-Hs)) | 4xM+16 complex multiplications and 4 divisions of complex numbers by real numbers | 4xM+12 complex multiplications and 4 divisions of complex numbers by real numbers |
| ML detector | Choose between 256 hypothesis | Simple slicer | Simple slicer |

FIGURE 8

HIGH DIVERSITY TIME-SPACE CODING AND DECODING FOR MIMO SYSTEMS

FIELD OF THE INVENTION

The invention relates to a method and apparatus for achieving transmit diversity in telecommunication systems. More particularly, the invention relates to a method and apparatus for non-zero complex weighting and space-time coding of signals for transmission on multiple antennas.

BACKGROUND OF THE INVENTION

Discussion of the Background Art

Wireless communication has rapidly evolved over the past decades. Even today, when high performance and high bandwidth wireless communication equipment is made available there is demand for even higher performance at a higher bandwidth. If in the past the demand was for high quality in data and voice transmission, today there is an increase in focus on the transmission of video over wireless connections. As the demands increase there are design challenges that have to be met. While in general wireless is used in the mobile world, there are video applications that require wireless transmission between a stationary transmitter and receiver. One such case is the transmission of high-definition television (HDTV) signals from a source to an HDTV screen or projector. Such applications are described, for example, in PCT patent application PCT/IL/2004000779 entitled Wireless Transmission of High Quality Video and in U.S. provisional patent application 60/729,459 entitled Apparatus and Method for Uncompressed, Wireless Transmission of Video, both of which are assigned to common assignee, and both of which are herein incorporated in their entirety by the reference thereto.

In a multi-input multi-output (MIMO) system, there is the well-known phenomena in wireless communication of time-varying multi-path fading. Specifically, a transmitted signal propagates along multiple paths to a receiver causing fading of the received signal. Multi-path fading effect is overcome using one of a variety of techniques, such as time interleaving with error correction coding, implementation of frequency diversity by use of spread spectrum techniques, transmitter power control techniques, receiving antenna diversity, transmitting antenna diversity, or combinations thereof. Each technique has its own advantages and disadvantages.

Figure 1:
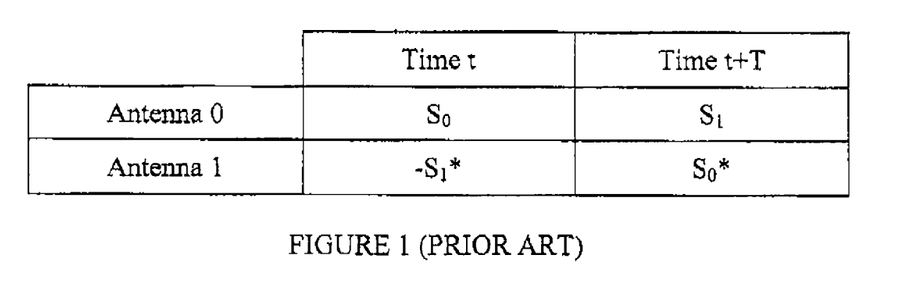
FIG. 1 shows an Alamouti coding scheme.

A method for transmit diversity was proposed by Alamouti for a case of two transmit antennas that offers, in case of a single receiving antenna, second order diversity for complex valued signals. Alamouti suggests the simultaneous transmission of two signals from two antennas during a symbol period. During the first symbol period, a signal S0 is transmitted from a first antenna and a signal S2 is transmitted from a second antenna. In the following symbol period, the first antenna transmits a signal—S1*, while the second antenna transmits a signal S0*. The notations S0* and S1* are complex conjugates of S0 and S1, respectively. Similarly this technique may be used in the code domain and/or in the space-frequency. In the Alamouti scheme, a pair of symbols is transmitted twice, in two consecutive time symbols and in either space or frequency domain. The Alamouti scheme assumes invariant channels between any two transmission periods and that the channel is known to the receiver. The encoding done for two adjust symbols as described in FIG. 1. Details of the Alamouti scheme may be found in Alamouti, S. M., A Simple Transmit Diversity Technique for Wireless Communication, IEEE Journal on Select Areas in Communications, Vol. 16, No. 8, pp. 1551-1458 (October 1998), which is herein incorporated in it entirety by this reference thereto. A major advantage of the 2×M Alamouti scheme comes from its easy maximum-likelihood (ML) detector implementation. The ML decoder is a good decoder with respect to minimum error probability.

SUMMARY OF THE INVENTION

The Alamouti scheme is deficient because it is generally limited to the use of two transmission antennas, and to a rate of "1," i.e., it transmits one independent signal per time unit. In some cases, it is beneficial to have more than two antennas, and thereby, increase the rate. Several such methods extending the Alamouti scheme have been suggested, including in U.S. Pat. No. 6,816,557 by Kuchi et al. As with previous solutions, each of these approaches has various shortcomings, including but not necessarily limited to, the fact that there is no rate increase in the Kuchi implementation.

It would be therefore advantageous to provide a method and apparatus that have simple implementations on both the transmit and the receive side, while increasing the number of usable antennas and the transmission rate. It would be further advantageous if the ML detector used for the Alamouti scheme could be used in such a method and apparatus for improved error performance.

A diversity transmission scheme uses a number of antennas that is greater than the limitation of two transmitting antennas in the well-known Alamouti scheme. In an embodiment comprising four antennas, the antennas transmit in pairs such that each antenna transmits a block that is used in the Alamouti scheme. This increases the transmission rate. For example, the transmission of two signals at a given time slot increases transmission rate by a factor of two. The invention not only increases the number of antennas, but also increases the transmission rate. At the receiver end, the code is decoded without matrix inversion and without much noise enhancement. Moreover, noise enhancement stability is increased by a simple, partial interference cancellation scheme, that results in improved decoding performance.

DETAILED DESCRIPTION OF EMBODIMENTS

A method and apparatus for diversity transmission uses a greater number of antennas than the limitation of two transmitting antennas imposed by the well-known Alamouti scheme. In an embodiment comprising four antennas, the antennas transmit in pairs such that each antenna transmits a block that is used in the Alamouti scheme. This increases the transmission rate. For example, the transmission of two signals at a given time slot increases the transmission rate by a factor of two. At the receiver end, the code is decoded without matrix inversion and without significant noise enhancement Moreover, improved stability to noise enhancement is achieved by a simple, partial interference cancellation technique, that results in improved decoding performance.

Figure 2:
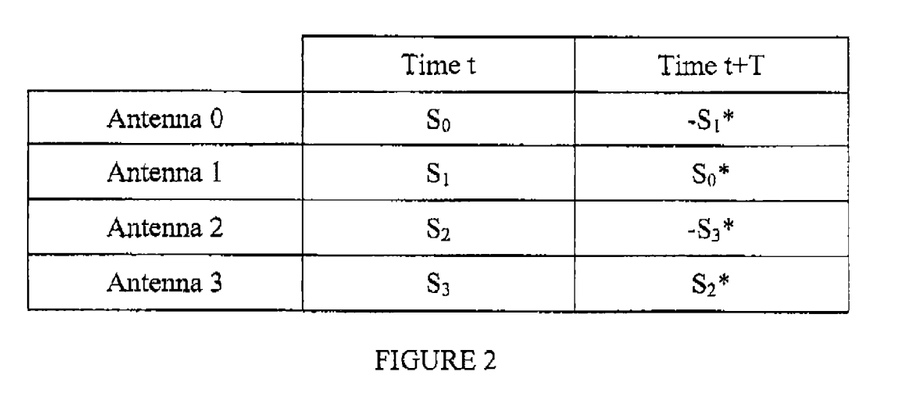
FIG. 2 shows a coding scheme for use with four transmitting antennas in accordance with the invention.

FIG. 2 shows a coding scheme that improves upon the Alamouti coding scheme and thereby enables for example, four transmitting antennas and a higher transmission rate. Antennas '0' and '1' transmit symbols $S_0$ and $S_1$ in a first time period, for example time period 't', while antennas '2' and '3' transmit symbols S2 and S3. In the immediately subsequent time period, for example time period 't+T', antenna '0' transmits symbol $-S_1^*$ and antenna '1' transmits symbol $S_0^*$ which are the complex conjugates of symbols $-S_1$ and $S_0$, respectively. During the same subsequent time period, i.e. at time period 't+T', antenna '2' transmits symbol $-S_3^*$ and antenna '3' transmits symbol $S_2^*$, which are the complex conjugates of symbols $-S_3$ and $S_2$, respectively. According to the disclosed invention as described in more detail with respect to FIG. 3, a source matrix S is transmitted having the form of:

$$S = \begin{bmatrix} S_0 & -S_1^* \\ S_1 & S_0^* \\ S_2 & -S_3^* \\ S_3 & S_2^* \end{bmatrix} \quad (1)$$

Figure 3:
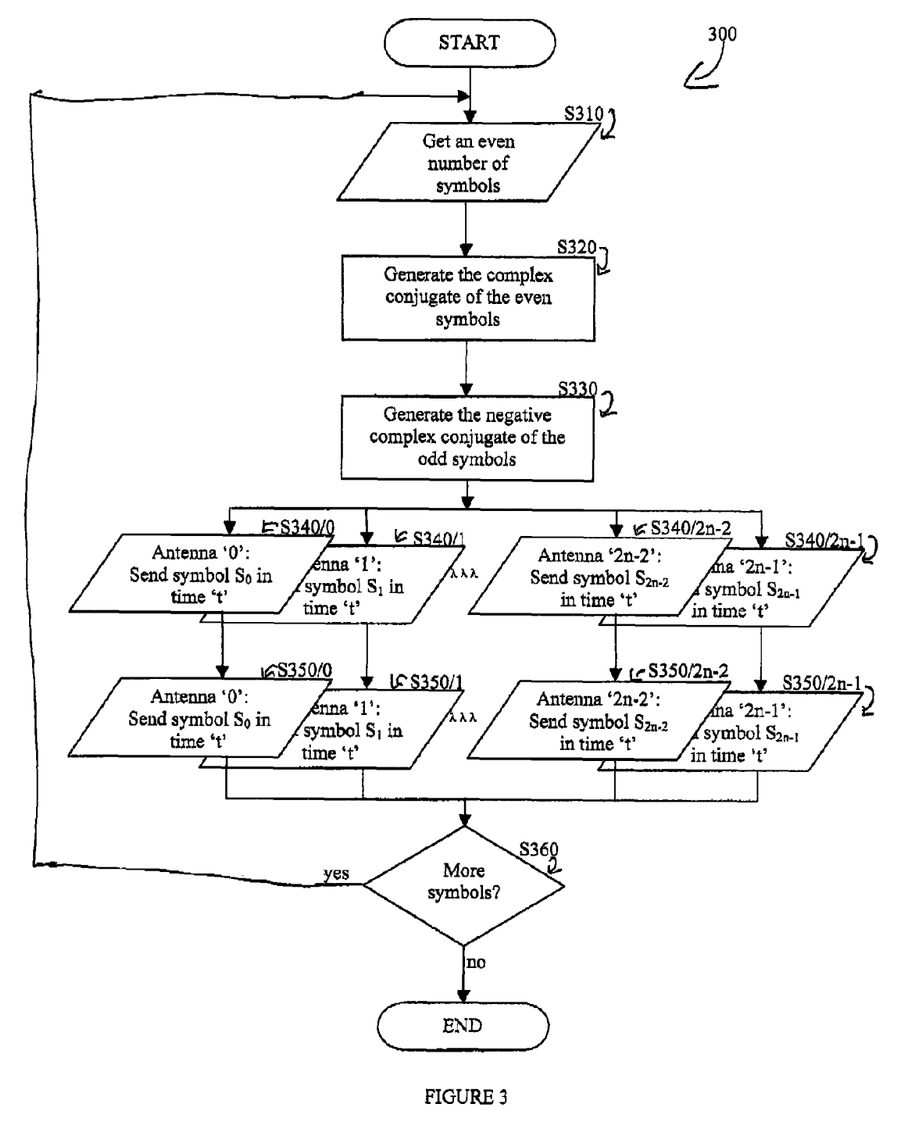
FIG. 3 is a flowchart showing for the transmission method of the disclosed coding scheme.

FIG. 3 shows a method for transmitting a source matrix of a coding scheme in accordance with the disclosed invention. In step S310, an even number of symbols are received for transmission, for example symbols $S_0$, $S_1$, $S_2$, and $S_3$. In step S320, the complex conjugates of the even symbols is generated, for example, $S_0^*$ and $S_2^*$. In step S330, the negative complex conjugates of the odd symbols is generated, for example $-S_1^*$ and $-S_3^*$. In step S340, symbols $S_0$, $S_1$, $S_2$, and $S_3$ are transmitted, in a first time period 't' and in parallel, by antennas '0', '1', '2', and '3', respectively. In step S350, symbols $-S_1^*$, $S_0^*$, $-S_3^*$, and $S_2^*$ are transmitted in an immediately subsequent time period to the first time period, for example 't+T', and in parallel, by antennas '0', '1', '2', and '3', respectively. In step S360, it is determined if more symbols are to be received and, if so, execution continues with step S310; otherwise, execution terminates. A person skilled in the art would appreciate that, while the examples herein are for the transmission using four antennas, an even number of antennas equal to or greater than four may be used for the purpose of transmission in accordance with the disclosed invention without departure from the spirit of the invention and, therefore, such implementations are specifically included as part of the invention.

Figure 4:
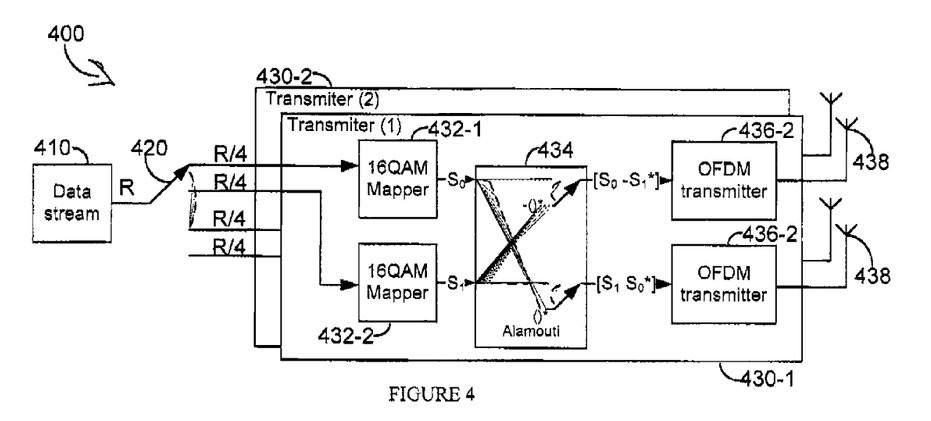
FIG. 4 is a schematic block diagram of a wireless transmitter enabled by the disclosed coding scheme.

FIG. 4 shows a schematic block diagram of a wireless transmitter 400 enabled by the transmit diversity scheme disclosed herein. FIG. 4 shows a transmitter having four antennas, however, this is provided merely as an example and should not be viewed as a limitation with regard to adding an additional even number of antennas.

A data streamer 410 provides a stream of symbols at a rate R and a selector 420 provides symbols to each one of four input channels at a rate of R/4 per channel. Two channels, corresponding to symbols $S_0$ and $S_1$, are connected to a transmitter 430-1 and two channels corresponding to symbols $S_2$ and $S_3$ are connected to the transmitter 430-2. Alamouti transmitters 430 are essentially identical and, hence, only one is described. A plurality of transmitters 430 may be used. The transmitter 430 comprises, for example, two 16-QAM mappers, i.e. 432-1 for $S_0$ and 432-2 for $S_1$. A person skilled in the art would readily appreciate that higher constellation mappers can be used as well. The output of each of the mappers 432 is coupled to a unit 434 which is a multiplexer and complex conjugate generator. Specifically, unit 434 is enabled to pass at a first time period, for example time period 't', each of the two symbols it receives in the first input and second input of unit 434, for example $S_0$ and $S_1$, respectively, to a first output and a second output, respectively, of unit 434. Unit 434 is further enabled to pass, at an immediately subsequent time period to the first time period, for example time period 't+T', the complex conjugate of the symbol from the first input, for example $S_0^*$, on the second output of unit 434, and the negative complex conjugate of the symbol from the second input, for example $-S_1^*$, on the first output of unit 434. The transmitter 430 is equipped with two OFDM transmitters 436-1 and 436-2, each receiving two symbols at two subsequent time periods. For example, OFDM transmitter 436-1 of transmitter 430-1 may transmit the sequence of symbols $S_0$ followed by $-S_1^*$, while OFDM transmitter 436-2 may transmit the sequence of symbols $S_1$ followed by $S_0^*$. Antennas 438-1 and 438-2 are coupled to OFDM transmitters 436-1 and 436-2 respectively to enable the wireless transmission over a wireless channel.

Figure 5:
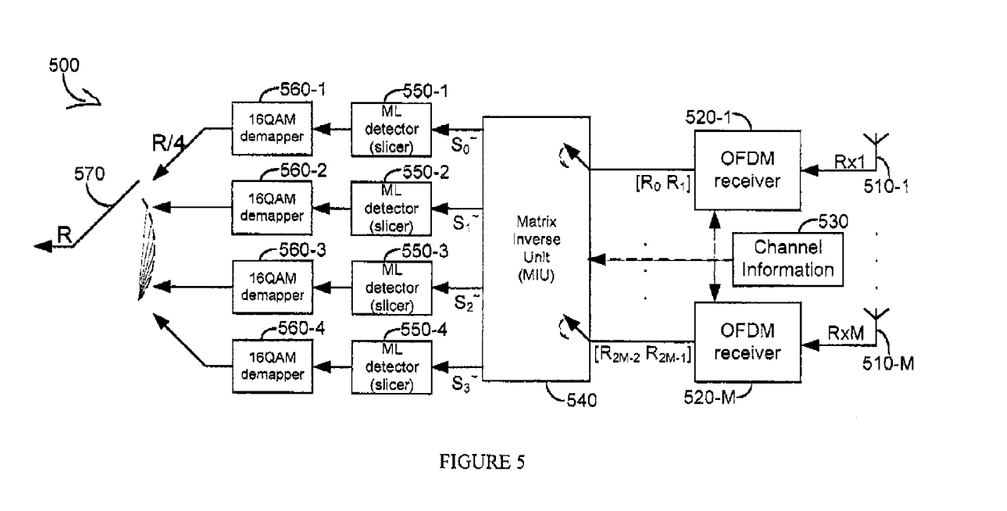
FIG. 5 is a schematic block diagram of a receiver configured to receive transmitted signals using the disclosed coding scheme.

FIG. 5 is a block diagram of a receiver 500 configured to receive a transmission using the coding scheme in accordance with the disclosed transmission scheme. FIG. 5 is shown with respect to M receiving antennas and four transmitted symbols, $S_0$, $S_1$, $S_2$, and $S_3$, in two subsequent time periods, for example time period 't' and time period 't+T'. M OFDM receivers 520 are connected to M antennas 510 for the purpose of receiving the signal sent over the wireless channel. A detailed discussion of the channel and reception equations is provided below. Following is a description for the operation of each OFDM bin of the receivers 520. For each bin, each of the OFDM receivers 520, is connected to a matrix inverse unit that receives the received signals from the two subsequent time periods. Channel information is provided to the OFDM receivers 520 as well as to the matrix inverse unit (MIU) 540, the function of the later being explained in detail below with respect to FIG. 6. Key to the disclosed invention with respect to MIU 540 is the ability to perform the inversion of the matrix without a requirement for an extensive compute power and without noise amplification, thereby overcoming deficiencies of the prior art. The output of MIU 540 is an even number of symbols, for example four, each being fed to a respective detector 550. Such a detector may be a slicer as discussed in more detail below. The output of each of the detectors 550 is fed to a respective demapper 560. The characteristics of a demapper 560 depend on the transmitted constellation, for example a 16-QAM demapper. The output of demapper 560 is transferred as a stream of symbols in the correct order, that is $S_0$, $S_1$, $S_2$, and $S_3$, at a rate if R/4 of the rate of the output of selector 570. If an odd number of symbols, for example 2N symbols, is to be sent, a person skilled in the art could adapt the invention by using 2N detectors 550 units each coupled to a respective demapper 560. The selector 570 then operates at a rate of R/2N.

Hereinafter, the scheme for receiving a transmission of symbols represented by the matrix S (see equation (1) above), and which is performed in accordance with the transmitting method discussed therewith, is presented. More specifically, the background for the operation of MIU 540 is discussed. A straightforward implementation of MIU 540 is compute intensive, wasteful, and increases noise. Therefore, the invention provides for a solution that is computation efficient, more stable, does not enhance noise, and thus provides better error performance of the coded bits. A receiver, for example receiver 500, may have a plurality of receiving antennas, for example M antennas and therefore, at each bin, the wireless channel over which the wireless transmission takes place may be identified by a matrix H having M rows and having a number of columns that is equivalent to the even number of transmission antennas that transmit in accordance with the disclosed coding scheme, as discussed in more detail above. Hence the matrix H for the case where there are four transmitting antennas and two receiving antennas has the structure of:

$$H = \begin{bmatrix} h_{11} & h_{21} & h_{31} & h_{41} \\ h_{12} & h_{22} & h_{32} & h_{42} \end{bmatrix} \quad (2)$$

In accordance with the disclosed transmitting scheme, there are two adjacent received signals that may be presented as:

$$R = HS + N \quad (3)$$

where the matrix R is a matrix representing the received signal from M antennas of a specific OFDM bin over two subsequent time periods, for example 't' and 't+T', and hence:

$$R = \begin{bmatrix} r_0 & r_1 \\ r_2 & r_3 \\ \vdots & \vdots \\ r_{2M-2} & r_{2M-1} \end{bmatrix} \quad (4)$$

such that the even indexed signals correspond to time period 't' and the odd indices correspond to time period 't+T'.

The matrix N represents the spatially and temporally uncorrelated additive white Gaussian noise (AWGN) for each of the received channels and hence the noise matrix for two subsequent time periods, for example time periods 't' and 't+T', is:

$$N = \begin{bmatrix} n_0 & n_1 \\ n_2 & n_3 \\ \vdots & \vdots \\ n_{2M-2} & n_{2M-1} \end{bmatrix} \quad (5)$$

By reshaping the received signals matrix of equation (3) into a vector form, two adjacent received signals presented as a linear transformation of the two adjacent transmitted symbols as follows:

$$r = H^* s + n \quad (6)$$
where, $$r = [r_0, r_1^*, r_2, r_3^*, \ldots, r_{2M-2}, r_{2M-1}^*]^T \quad (7)$$

$$n = [n_0, n_1^*, n_2, n_3^*, \ldots, n_{2M-1}^*]^T, \; s = [s_0, s_1, s_2, s_3]^T \quad (8)$$

$$H = \begin{bmatrix} h_{11} & h_{12} & h_{13} & h_{14} \\ h_{12}^* & -h_{11}^* & h_{14}^* & -h_{13}^* \\ \vdots & \vdots & \vdots & \vdots \\ h_{M1} & h_{M2} & h_{M3} & h_{M4} \\ h_{M2}^* & -h_{M1}^* & h_{M4}^* & -h_{M3}^* \end{bmatrix} \quad (9)$$

$$Cov(n) = \sigma^2 I \quad (10)$$

where it is noted that $\underline{n}$ is a white noise vector, as indicated by the covariance matrix (10).

In an Alamouti system, limited by its two transmission antennas, and having M reception antennas, H is known to be an orthogonal matrix for any channel realization. In this case, multiplying r from the right by $H^T$, $H^T$ being the conjugate transposed matrix of H, leaves the AWGNs spatially uncorrelated and, therefore, enables the extraction of the unknown transmitted symbols separately by a simple decoder that works on each signal separately, without losing any optimality. A person skilled in the art would note that $H^T H$ for the signal received in the disclosed diversity transmission does not provide this capability. However, the inventors have noted that the $H^T H$ is a four-by-four matrix having the structure shown in equation (11). Each two-by-two sub-matrix of the four-by-four matrix further has the characteristics described in equations (12) through (16). The sub-matrices in the first and fourth quadrants of the matrix are diagonal matrices, i.e. basically a constant times the unity matrix. The sub-matrices in the second and third quadrants of the matrix are orthogonal matrices for any possible H. In one embodiment of the invention, the matrix H is periodically updated to account for the varying transmission conditions. A periodic update of the matrix may take place during the vertical blanking period of a wireless transmitter, and in accordance with the method disclosed in U.S. provisional patent application 60/756,792 entitled Using the Video Blanking Period for the Maintenance of a Modem Used for Wireless Transmission of a Video, assigned to common assignee, and which is herein incorporated in its entirety by this reference thereto. In other embodiments, the matrix may be updated more frequently, using either pilot signals or based on previously decoded symbols, as noted in U.S. provisional patent application 60/729,459 entitled Apparatus and Method for Uncompressed, Wireless Transmission of Video and U.S. provisional patent application 60/758,060 entitled Use of Pilot Symbols for Data Transmission in Uncompressed, Wireless Transmission of Video, both assigned to common assignee, and herein incorporated in their entirety by this reference thereto.

$$(H^T H) = \begin{bmatrix} |a|^2 I_2 & C \\ C^* & |b|^2 I_2 \end{bmatrix}_{4 \times 4} \quad (11)$$

$$C = \begin{bmatrix} \alpha & \beta \\ -\beta^* & \alpha^* \end{bmatrix} \quad (12)$$

$$|a|^2 = \sum_{m=1}^{M} [|h_{m,1}|^2 + |h_{m,2}|^2] \quad (13)$$

$$|b|^2 = \sum_{m=1}^{M} [|h_{m,3}|^2 + |h_{m,4}|^2] \quad (14)$$

$$\alpha = \sum_{m=1}^{M} [h_{m,1}^* h_{m,3} + h_{m,2} h_{m,4}^*] \quad (15)$$

$$\beta = \sum_{m=1}^{M} [h_{m,1}^* h_{m,4} - h_{m,2} h_{m,3}^*] \quad (16)$$

Use of equations (12) through (16) allows for a straightforward and simple implementation of the extraction of transmitted symbols without requiring the inversion of matrices, as further shown in more detail below. By manner of example, for the case where M=2, i.e. there are two reception antennas, and there are four transmitting antennas as discussed above, it can be shown, for example, that:

$$|a|^2 = |h_{11}|^2 + |h_{21}|^2 + |h_{12}|^2 + |h_{22}|^2 \quad (17)$$

$$|b|^2 = |h_{31}|^2 + |h_{41}|^2 + |h_{32}|^2 + |h_{42}|^2 \quad (18)$$

$$\alpha = h_{11}^* h_{13} + h_{12} h_{14}^* + h_{21}^* h_{23} + h_{22} h_{24}^* \quad (19)$$

$$\beta = h_{11}^* h_{14} - h_{12} h_{13}^* + h_{21}^* h_{24} - h_{22} h_{23} \quad (20)$$

The inventors have therefore shown that the values of $\alpha$ and $\beta$ may be interpreted as cross-correlation. Additional discussion of these values is provided below. The structure of $H^T H$ as explained above may be used to extract the received symbols from the received signals, by first defining a matrix W as:

$$W = \begin{bmatrix} |b|^2 I_2 & -C \\ -C^{*T} & |a|^2 I_2 \end{bmatrix}_{4 \times 4} \quad (21)$$

It is recognized that matrix W has a similar structure to that of $H^T H$, i.e. it is composed of two sub-matrices that are diagonal and two sub-matrices that are orthogonal. Matrices H and W result from the parameters of the channel as discussed herein. Summarizing the above, it was first shown that by multiplying the received signal by the transposed matrix H results in:

$$\tilde{r} = H^T r = H^T H s + H^T n \quad (22)$$

Then, by further multiplying equation (22) by the matrix W the result is:

$$\underline{r} = W\tilde{r} = WH^T H s + WH^T n = s + WH^T n \quad (23)$$

Figure 6:
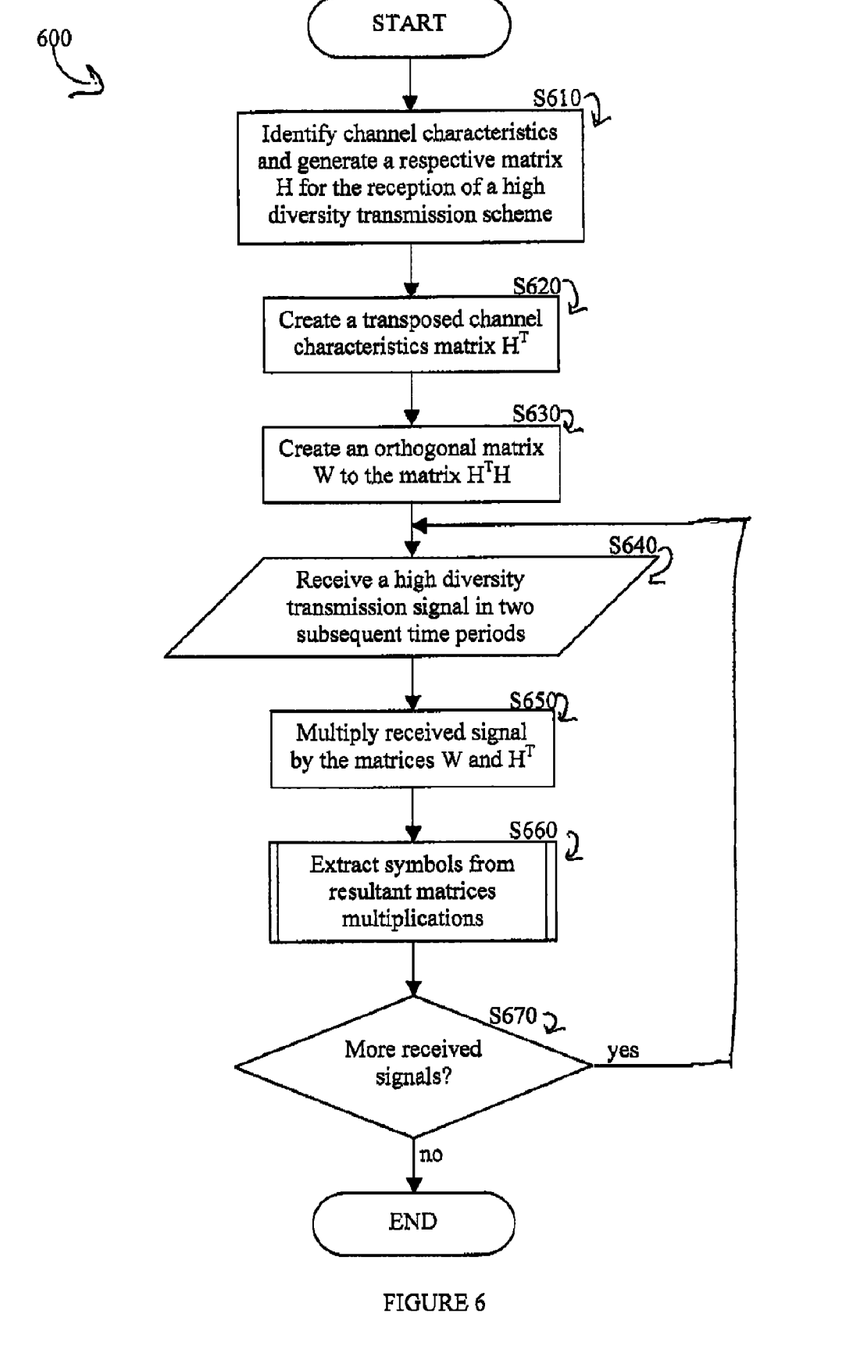
FIG. 6 is a flowchart showing reception of a transmission using the disclosed coding scheme.

This is because W is the inverse matrix of the matrix $H^T H$. Therefore, there has been shown efficient methods of transmission and reception of the disclosed transmit diversity scheme that do not require the inversing of matrices and that avoid the phenomenon of noise enhancement, which is a result of inverting a matrix having a condition number that may be greater than 1. FIG. 6, shows a flowchart 600 for the reception of the disclosed diversity transmission. In step S610, the channel characteristics are identified and a matrix H representative of these characteristics is created. Matrix H represents the channel characteristics when a transmission of the proposed diversity transmission is used, i.e. a transmission involving four or more of an even number of transmitting antennas, to two or more receiving antennas. In step S620, a transposed matrix $H^T$ of the matrix H is created. A transposed matrix of an m-by-n matrix A is an n-by-m matrix $A^T$ defined by $A^T[i,j] = A[j,i]$ for $1 \leq i \leq n$ and $1 \leq j \leq m$. The operation is straightforward and does not involve the use of an inversing the matrix. In step S630, a matrix W is created which is an orthogonal matrix to the matrix $H^T H$. Due to the specific characteristics of the disclosed diversity transmission, the matrix W shown in equation (19) above may be directly created from the channel parameters and the equations (12) through (16) discussed in detail above. The operation is straightforward and does not involve the use of an inversing the matrix. In step S640, a sequence of two consecutive signals of the disclosed diversity transmission are received in two subsequent time periods, for example, time periods 't' and "t+T'. In step S650, the received signal is first multiplied by the matrix H and then by the matrix W, as also shown in more detail with respect to equations (20) and (21) above. In step S660, the symbols are extracted. Additional details for method of extraction of the symbol and removing noise are provided below. In step S670, it is determined whether there is reception of additional signals and, if so, execution continues with step S640; otherwise, execution ends. The method discussed herein above discloses the capability of transmitting, receiving, and decoding for any channel characteristic that is not necessarily a predetermined characteristic. The encoding is efficient for a multi-input multi-output (MIMO) system because it is not necessary to invert matrices, which is known to be an inefficient process, and further because it avoids the side effect of such inversing of matrices and the accompanying effect of noise enhancement. The steps described herein may be performed in software, hardware, firmware, or any combination thereof, and specifically, in conjunction with the receiver 500 described with respect to FIG. 5.

A person skilled in the art could easily show that the inverse matrix $(H^T H)^{-1}$ is found to be:

$$(H^T H)^{-1} = \frac{1}{|a|^2 |b|^2 - (|\alpha|^2 + |\beta|^2)} \begin{bmatrix} |b|^2 I_2 & -C \\ -C^* & |a|^2 I_2 \end{bmatrix} \quad (24)$$

It should be further noted that as the number of reception antennas M increases, the following typically occurs:

$$\frac{|\alpha^2| + |\beta^2|}{|a^2||b^2|} \to 0 \quad (25)$$

This means that H becomes more orthogonal as M increases. Further, multiplying r by the pseudo-inverse of H and then estimating the transmitted symbols by applying the ML decision rule on each transformed signal separately is justified (the Zero-Forcing detector), especially for large number of M, i.e. a large number of receiving antennas. Such a detector is expected to become closer to the ML detector with the increasing of M.

Figure 7:
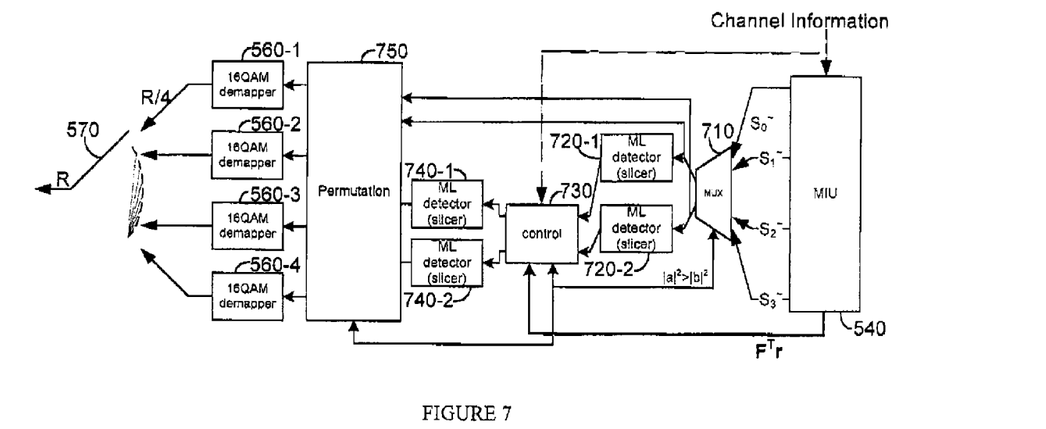
FIG. 7 is a schematic block diagram of an exemplary portion of a receiver for the disclosed coding scheme and having a detector that uses successive cancellation.

In another embodiment of the invention, the extraction of the symbols is done by first comparing the square absolute values $|a|^2$ and $|b|^2$. If $|b|^2$ is smaller then $|a|^2$ then it means that $S_0$ and $S_1$ have suffered less noise interference than $S_2$ and $S_3$. If $|a|^2$ is smaller then $|b|^2$ then it means that $S_2$ and $S_3$ have suffered less noise interference than $S_0$ and $S_1$. The pair that has suffered less noise interference is selected for full decoding and their influence on the received signals can then be removed, resulting in a standard Alamouti code for the other two components which can now be easily extracted. This operation is explained in further detail below. The result is an efficient decoding of the pair of symbols that have suffered less noise interference and, after their removal, a higher diversity order is achieved for the symbols that were more impacted by noise interference. FIG. 7 shows an interference cancellation decoder and a portion of a receiver in block diagram 700. The receiver is essentially identical until and including the MIU 540 and, therefore the stages from the plurality of reception antennas until the MIU 540 are not shown. The output of the MIU 540 is a plurality of an even number of symbols, for example four symbols in the case of four transmitting antennas. A multiplexer unit 710 selects one of a couple of the symbols, either $S_0$ and $S_1$, or $S_2$ and $S_3$ based on a selection criterion described in more detail below. The even number of outputs of multiplexer 710 are fed into respective ML detectors 720. In the case of the reception of four symbols, there are two ML detectors 720-1 and 720-2. The control unit 730 determines based on channel information the control signal that detects which of the signals to transfer to through the multiplexer. Basically, such determination is made so that the symbols that were least affected by noise are passed through multiplexer 710 first. The control unit 730 determines whether $|b|^2 > |a|^2$. If $|b|^2$ is smaller then it means that $S_0$ and $S_1$ have been less impacted by noise. By contrast if $|a|^2$ is smaller, then $S_2$ and $S_3$ have been less impacted by noise. A second set of ML detectors 740 receives the output of the control unit 730 and the result of the detection, as well as the signals fed directly from the output of multiplexer 710, are used in permutation unit 750 to feed the plurality of demappers, e.g. 16-QAM demappers, and the selector 570, the later operating as described with respect to FIG. 5 above. An advantage of this approach is further reduction of the noise interference as well as a higher diversity order.

A control unit 730 enables symbol cancellation along with a linear zero-forcing detector. The use of symbol cancellation allows the subtraction of interferences from already detected symbols from the received signal vector, which results in a modified received vector in which fewer interferers are present. The control unit 730 performance is affected by the order in which the symbols are detected. In accordance with the disclosed invention the noise variances are:

$$Cov(n_0) = Cov(n_1) \qquad (26)$$
$$= \frac{\sigma^2 |b|^2}{|a|^2 |b|^2 - (|\alpha|^2 + |\beta|^2)}$$
$$= \frac{\sigma^2}{|a|^2 \left(1 - \frac{|\alpha|^2 + |\beta|^2}{|a|^2 |b|^2}\right)}$$

$$Cov(n_2) = Cov(n_3)$$
$$= \frac{\sigma^2 |a|^2}{|a|^2 |b|^2 - (|\alpha|^2 + |\beta|^2)}$$
$$= \frac{\sigma^2}{|b|^2 \left(1 - \frac{|\alpha|^2 + |\beta|^2}{|a|^2 |b|^2}\right)}$$

After performing a first stage of zero forcing, a first pair of detected symbols is found. The pair that comes with the lower noise variance, according to the ML detection 720, is used for $\hat{s}_i$. The detection rule is:

if $|a|^2 > |b|^2$ attain $\hat{s}_0, \hat{s}_1$ else attain $\hat{s}_2, \hat{s}_3$ \qquad (27)

The accurately detected pair of symbols may now be subtracted from a linear transformation of the received signals $\hat{r} = H^T r$. Note that $\hat{r}$ is already available from equation (22). Therefore, it can be shown that:

$$\hat{r} = (H^T H)s + H^T n = \begin{bmatrix} |a|^2 I_2 & C \\ C^* & |b|^2 I_2 \end{bmatrix} \begin{bmatrix} s_0 \\ s_1 \\ s_2 \\ s_3 \end{bmatrix} + H^T n. \qquad (28)$$

Then, the noisier pair is detected by applying the ML detection rule to each of the symbols $\bar{s}_i, \bar{s}_{i+1}$, separately, for $i=0$ or 2, assuming the transmission is of four symbols, where $\bar{s}_i$, $\bar{s}_{i+1}$ are found as follows:

$$\text{if } |a|^2 > |b|^2 \begin{bmatrix} \bar{s}_2 \\ \bar{s}_3 \end{bmatrix} = \frac{1}{|b|^2} \left( \begin{bmatrix} \hat{r}_2 \\ \hat{r}_3 \end{bmatrix} - C^* \begin{bmatrix} \hat{s}_0 \\ \hat{s}_1 \end{bmatrix} \right) \qquad (29)$$

$$\text{else } \begin{bmatrix} \bar{s}_0 \\ \bar{s}_1 \end{bmatrix} = \frac{1}{|a|^2} \left( \begin{bmatrix} \hat{r}_0 \\ \hat{r}_1 \end{bmatrix} - C \begin{bmatrix} \hat{s}_2 \\ \hat{s}_3 \end{bmatrix} \right)$$

In a specific implementation of the invention, comprising four transmitting antennas and M receiving antennas, after attaining $H^T r$, an operation that requires 4*M complex multiplications, only one pair of signals is required to be retrieved. These two operations require 4*M+8 complex multiplications instead of 4*M+16 for a zero-forcing detector case, or 4*M*256 for a QPSK implementation that provides a similar transmission rate. Then, the following operation requires only four complex multiplications, i.e. the multiplication with C. Therefore, the total number of complex multiplications for control unit 730 is 4*M+12, M being the number of the reception antennas, compared to 4*M+8 for a zero-forcing detector. Note that the control unit 730 may be implemented with less complex multiplications than a zero-forcing detector.

Figure 8:
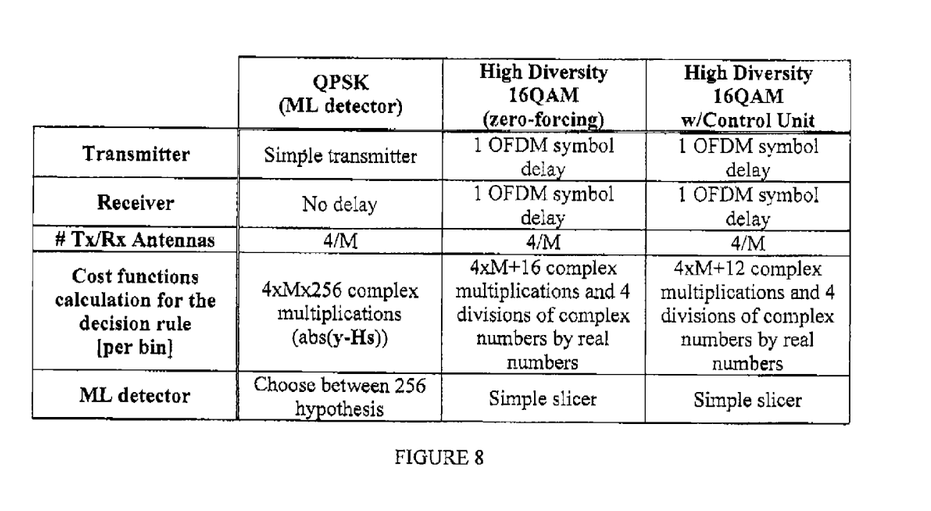
FIG. 8 is a summary table comparing various embodiments of the invention.

FIG. 8 provides a detailed comparison between the various implementations, showing the advantages of the implementation over prior art solutions transmitting at the same rate. That is, the use of a 16 QAM according to the invention versus QPSK provides the same rate of transmission, however there is less complexity at the receiving end, despite the richer constellation used. A person skilled in the art would appreciate that this is true also when comparing richer constellations.

While several flowcharts comprising of a plurality of steps has been shown herein, the invention should not be viewed as limited to a sequentially executed series of steps, and other implantations in software, hardware, and combinations thereof, desired to achieve the same outcome are specifically included. Furthermore, and as noted above, as person skilled in the art would note that the 16 QAM constellations is merely provided as an example, and other larger constellation may be used and are specifically included as part of the invention. It should be further noted that the methods disclosed herein may be implemented in software, firmware, hardware, or any combination thereof, including, but not limited to, a monolithic semiconductor device that is enabled to receive a high-diversity transmission scheme, where the transmission is made from a plurality of transmission antennas, the number of which is greater than or equal to four. A receiver and/or a transceiver embodying the invention disclosed herein is also part of the invention.

Although the invention is described herein with reference to the preferred embodiment, one skilled in the art will readily appreciate that other applications may be substituted for those set forth herein without departing from the spirit and scope of the invention. Accordingly, the invention should only be limited by the Claims included below.

The invention claimed is:

1. A method of wireless transmission, the method comprising:
receiving a plurality of antenna symbols via a plurality of pairs of transmission streams, wherein a pair of transmission streams represents a single pair of symbols at a given time, such that during a first time period each of said pairs of transmission streams includes a first pair of symbols and wherein during a second time period, each of said pairs of streams includes a second pair of symbols corresponding to complex conjugates of said first pair of symbols previously included in that stream; generating an output corresponding to said at least two pairs of symbols by multiplying a received signal matrix which includes the at least two pairs of received symbols by a channel matrix of complex values representing fading characteristics between transmit and receive antennas and by a second matrix which second matrix is orthogonal to a product of the channel matrix with a conjugate transpose of the channel matrix; and generating said output based on a product of said multiplying.

2. The method of claim 1, wherein a first diagonal of said second matrix comprises at least two diagonal sub-matrices, and a second diagonal of said second matrix comprises at least two sub-matrices orthogonal to one another.

3. The method of claim 2 comprising:
based a selection criterion related to the sub-matrices of said first diagonal, selecting a set from first and second sets, each including two or more symbols of the received symbols;
decoding symbols of the selected set; and decoding symbols of another of said first and second sets based on the decoded symbols of said selected set.

4. The method of claim 2, wherein selecting the set comprises selecting the set based on a comparison between determinants of the sub-matrices of said first diagonal.

5. The method of claim 1, wherein during said first time period first and second streams of a pair of said plurality of pairs of transmission streams include first and second symbols, respectively, and wherein during said second time period said first and second streams include a negative conjugate of said second symbol and a conjugate of said first symbol, respectively.

6. The method of claim 5, wherein during said first time period third and fourth streams of another pair of said plurality of pairs of transmission streams include third and fourth symbols, respectively, and wherein during said second time period said third and fourth streams include a negative conjugate of said fourth symbol and a conjugate of said third symbol, respectively.

7. The method of claim 1, wherein said second time period is immediately subsequent to said first time period.

8. A wireless receiver to receive a plurality of antennas symbols via a plurality of pairs of transmission streams representing a plurality of different pairs of symbols, and to generate an output corresponding to said at least two pairs of symbols, wherein during a first time period each of said pairs of transmission streams includes a first pair of symbols, and wherein during a second time period each of said pairs of streams includes a second pair of symbols corresponding to complex conjugates of said first pair of symbols; and
wherein said receiver is further adapted to multiply a received signal matrix which includes the at least two pairs of received symbols by a channel matrix of complex values representing fading characteristics between transmit and receive antennas and by a second matrix which second matrix is orthogonal to a product of the channel matrix with a conjugate transpose of the channel matrix; and to generate said output based on a product of said multiplying.

9. The receiver of claim 8, wherein a first diagonal of said second matrix comprises at least two diagonal sub-matrices, and a second diagonal of said second matrix comprises at least two sub-matrices orthogonal to one another.

10. The receiver of claim 9 comprising a decoder to select, based a selection criterion related to the sub-matrices of said first diagonal, a set from first and second sets, each including two or more symbols of the received symbols; to decode symbols of the selected set; and to decode symbols of another of said first and second sets based on decoded symbols of said selected set.

11. The receiver of claim 10, wherein the decoder is to select the set based on a comparison between determinants of the sub-matrices of said first diagonal.

12. The receiver of claim 8, wherein during said first time period first and second streams of a pair of said plurality of pairs of transmission streams include first and second symbols, respectively, and wherein during said second time period said first and second streams include a negative conjugate of said second symbol and a conjugate of said first symbol, respectively.

13. The receiver of claim 12, wherein during said first time period third and fourth streams of another pair of said plurality of pairs of transmission streams include third and fourth symbols, respectively, and wherein during said second time period said third and fourth streams include a negative conjugate of said fourth symbol and a conjugate of said third symbol, respectively.

14. A multiple-input-multiple-output wireless transmission system comprising:
a wireless transmitter to transmit a plurality of pairs of wireless transmission streams via a plurality of transmit antennas, said plurality of pairs of transmission streams representing a plurality of different pairs of symbols, wherein during a first time period each of said pairs of transmission streams includes a first pair of symbols, and wherein during a second time period each of said pairs of streams includes a second pair of symbols corresponding to complex conjugates of said first pair of symbols; a receiver to receive via a plurality of receive antennas symbols of the plurality of pairs of transmission streams, to generate an output corresponding to said at least two pairs of symbols; and
to multiply a received signal matrix which includes the at least two pairs of received symbols by a channel matrix of complex values representing fading characteristics between transmit and receive antennas and by a second matrix which second matrix is orthogonal to a product of the channel matrix with a conjugate transpose of the channel matrix; and to generate said output based on a product of said multiplying.

15. The system of claim 14, wherein a first diagonal of said second matrix comprises at least two diagonal sub-matrices, and wherein a second diagonal of said second matrix comprises at least two sub-matrices orthogonal to one another.

16. The system of claim 15, wherein said receiver comprises a decoder to select, based a selection criterion related to the sub-matrices of said first diagonal, a set from first and second sets, each including two or more symbols of the received symbols; to decode symbols of the selected set; and to decode symbols of another of said first and second sets based on decoded symbols of said selected set.

17. The system of claim 16, wherein the decoder is to select the set based on a comparison between determinants of the sub-matrices of said first diagonal.

18. The system of claim 14, wherein during said first time period first and second streams of a pair of said plurality of pairs of transmission streams include first and second symbols, respectively, and wherein during said second time period said first and second streams include a negative conjugate of said second symbol and a conjugate of said first symbol, respectively.

19. The system of claim 18, wherein during said first time period third and fourth streams of another pair of said plurality of pairs of transmission streams include third and fourth symbols, respectively, and wherein during said second time period said third and fourth streams include a negative conjugate of said fourth symbol and a conjugate of said third symbol, respectively.

* * * * *